United States Patent
Shimura et al.

(10) Patent No.: US 10,720,845 B2
(45) Date of Patent: Jul. 21, 2020

(54) POWER SUPPLY APPARATUS AND IMAGE FORMING APPARATUS CONTROLLING SWITCHING ELEMENTS TO OUTPUT A VOLTAGE

(71) Applicant: CANON KABUSHIKI KAISHA, Tokyo (JP)

(72) Inventors: Yasuhiro Shimura, Yokohama (JP); Hiroki Asano, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/399,247

(22) Filed: Apr. 30, 2019

(65) Prior Publication Data

US 2019/0260295 A1    Aug. 22, 2019

Related U.S. Application Data

(63) Continuation of application No. 15/958,344, filed on Apr. 20, 2018, now Pat. No. 10,320,299.

(30) Foreign Application Priority Data

Apr. 28, 2017    (JP) .................................. 2017-090175

(51) Int. Cl.
| | |
|---|---|
| *H02M 3/335* | (2006.01) |
| *G03G 15/00* | (2006.01) |
| *B41J 2/435* | (2006.01) |
| *H02M 1/32* | (2007.01) |
| *H02M 1/00* | (2006.01) |

(52) U.S. Cl.
CPC ......... *H02M 3/33507* (2013.01); *B41J 2/435* (2013.01); *G03G 15/5004* (2013.01); *G03G 15/80* (2013.01); *H02M 1/32* (2013.01); *H02M 3/33569* (2013.01); *H02M 2001/0032* (2013.01)

(58) Field of Classification Search
None
See application file for complete search history.

(56) References Cited

U.S. PATENT DOCUMENTS

| | | | | |
|---|---|---|---|---|
| 5,644,479 | A * | 7/1997 | Yoshida | ............ H02M 3/33569 363/131 |
| 8,503,197 | B2 | 8/2013 | Hayasaki | |
| 9,621,061 | B2 | 4/2017 | Hayasaki | |
| 9,823,617 | B2 | 11/2017 | Shimura | |
| 9,897,964 | B2 | 2/2018 | Shimura | |
| 9,966,865 | B2 | 5/2018 | Shimura | |
| 2003/0142514 | A1 * | 7/2003 | Hosotani | ............. H02M 3/3385 363/21.02 |
| 2008/0219033 | A1 * | 9/2008 | Nishikawa | ........ H02M 3/33569 363/21.16 |
| 2011/0026275 | A1 | 2/2011 | Huang | |
| 2012/0033455 | A1 | 2/2012 | Hosotani | |

(Continued)

FOREIGN PATENT DOCUMENTS

| | | |
|---|---|---|
| JP | 4370844 | 11/2009 |
| JP | 2010-142071 | 6/2010 |

*Primary Examiner* — Jeffrey A Gblende
(74) *Attorney, Agent, or Firm* — Venable LLP

(57) ABSTRACT

The power supply apparatus includes a control unit configured to perform control of gradually changing a turn-on duty of a first switching element when a first voltage mode is switched to a second voltage mode or when the second voltage mode is switched to the first voltage mode.

19 Claims, 10 Drawing Sheets

(56) References Cited

U.S. PATENT DOCUMENTS

| | | |
|---|---|---|
| 2012/0161514 A1 | 6/2012 | Choi |
| 2013/0272031 A1 | 10/2013 | Hosotani |
| 2013/0279204 A1 | 10/2013 | Yang |
| 2013/0308347 A1* | 11/2013 | Sato .................... H02M 3/337 363/21.03 |
| 2014/0376273 A1 | 12/2014 | Hosotani |
| 2014/0376276 A1* | 12/2014 | Yamadaya .......... H02M 3/3376 363/21.02 |
| 2015/0016152 A1* | 1/2015 | Kojima ................ G03G 15/80 363/21.02 |
| 2015/0256088 A1* | 9/2015 | Ohtake ................. H02M 1/36 363/21.02 |
| 2017/0176918 A1 | 6/2017 | Shimura |
| 2018/0212508 A1 | 7/2018 | Kobayashi |

* cited by examiner

POWER SUPPLY APPARATUS AND IMAGE FORMING APPARATUS CONTROLLING SWITCHING ELEMENTS TO OUTPUT A VOLTAGE

This application is a continuation of U.S. application Ser. No. 15/958,344, filed Apr. 20, 2018, which claims priority to Japan 2017-090175, filed on Apr. 28, 2017, the contents of each of which is hereby incorporated by reference.

BACKGROUND OF THE INVENTION

Field of the Invention

The present invention relates to a power supply apparatus, for example, a switching power supply that employs an active clamp system in an insulating convertor using a flyback transformer, and an image forming apparatus including the power supply apparatus.

Description of the Related Art

There has hitherto been a switching power supply configured to convert an AC voltage supplied from, for example, a commercial power source into a DC voltage. In the switching power supply, in order to reduce power consumption, there is a demand for improving the efficiency of the switching power supply. Here, the efficiency of the switching power supply refers to a ratio of electric power output from the switching power supply with respect to electric power supplied to the switching power supply. In Japanese Patent No. 4370844, as a known example of the switching power supply capable of improving the power supply efficiency, there is disclosed a power supply that employs an active clamp system in an insulating convertor using a flyback transformer.

In Japanese Patent Application Laid-Open No. 2010-142071, as means for improving the efficiency of the switching power supply in a light load state, there is disclosed a method of decreasing an output voltage of the switching power supply in the light load state of the switching power supply.

However, when the output voltage of the switching power supply is changed abruptly in the switching power supply employing the active clamp system, overshoot and undershoot occur. Further, there is also a problem, for example, in that a through-current flows through a switching element when the output voltage of the switching power supply is changed abruptly.

SUMMARY OF THE INVENTION

One aspect of the present invention has been made under the above-mentioned circumstances, and is a power supply apparatus capable of preventing overshoot and undershoot and preventing a through-current from flowing through a switching element when an output voltage of a switching power supply is controlled to be changed.

Another aspect of the present invention is a power supply apparatus including a transformer including a primary winding and a secondary winding, a first switching element connected in series to the primary winding of the transformer, a second switching element connected in parallel to the primary winding of the transformer, a capacitor connected in series to the second switching element, and is connected in parallel to the primary winding of the transformer together with the second switching element, a smoothing and rectifying unit configured to smooth and rectify a voltage induced to the secondary winding of the transformer, a feedback unit configured to output a signal according to the voltage smoothed and rectified by the smoothing and rectifying unit, a control unit configured to control an operation of the first switching element and the second switching element based on the signal output from the feedback unit so that the voltage smoothed and rectified by the smoothing and rectifying unit becomes a predetermined voltage, the control unit configured to implement a control operation in a first voltage state, in which the predetermined voltage is a first voltage, and in a second voltage state, in which the predetermined voltage is a second voltage larger than the first voltage, and a notification unit configured to notify the control unit of switching between the first voltage state and the second voltage state, wherein the control unit is configured to perform one of the following: when the notification unit notifies switching from the first voltage state to the second voltage state, the control unit changes a condition to a first switching condition of performing control of gradually increasing a turn-on duty of the first switching element, and changes a voltage state to the second voltage state after a level of the signal output from the feedback unit reaches a first value or less, and when the notification unit notifies switching from the second voltage state to the first voltage state, the control unit changes a condition to a second switching condition of performing control of gradually decreasing the turn-on duty of the first switching element, and changes a voltage state to the first voltage state after the level of the signal output from the feedback unit reaches a second value or more; and when the notification unit notifies switching from the first voltage state to the second voltage state by, the control unit changes a condition to the first switching condition of performing control of gradually increasing the turn-on duty of the first switching element, and changes a voltage state to the second voltage state after the level of the signal output from the feedback unit reaches the first value or more, and when the notification unit notifies switching from the second voltage state to the first voltage state, the control unit changes a condition to the second switching condition of performing control of gradually decreasing the turn-on duty of the first switching element, and changes a voltage state to the first voltage state after the level of the signal output from the feedback unit reaches the second value or less.

A further aspect of the present invention is an image forming apparatus including an image forming unit configured to form an image, and a power supply apparatus configured to supply electric power to the image forming apparatus, the power supply apparatus including a transformer including a primary winding and a secondary winding, a first switching element connected in series to the primary winding of the transformer, a second switching element connected in parallel to the primary winding of the transformer, a capacitor connected in series to the second switching element, and is connected in parallel to the primary winding of the transformer together with the second switching element, a smoothing and rectifying unit configured to smooth and rectify a voltage induced to the secondary winding of the transformer, a feedback unit configured to output a signal according to the voltage smoothed and rectified by the smoothing and rectifying unit, a control unit configured to control an operation of the first switching element and the second switching element based on the signal output from the feedback unit so that the voltage smoothed and rectified by the smoothing and rectifying unit becomes a predetermined voltage, the control unit configured to implement a control operation in a first voltage state, in which the predetermined voltage is a first voltage, and in a second voltage state, in which the predetermined voltage is a second voltage larger than the first voltage, and a notification unit, which is configured to notify the control unit of switching between the first voltage state and the second voltage state, wherein the control unit is configured to perform one of the following: when the notification unit notifies switching from the first voltage state to the second voltage state, the control unit changes a condition to a first switching condition of performing control of gradually increasing a turn-on duty of the first switching element, and changes a voltage state to the second voltage state after a level of the signal output from the feedback unit reaches a first value or less, and when the notification unit notifies switching from the second voltage state to the first voltage state, the control unit changes a condition to a second switching condition of performing control of gradually decreasing the turn-on duty of the first switching element, and changes a voltage state to the first voltage state after the level of the signal output from the feedback unit reaches a second value or more; and when the notification unit notifies switching from the first voltage state to the second voltage state, the control unit changes a condition to the first switching condition of performing control of gradually increasing the turn-on duty of the first switching element, and changes a voltage state to the second voltage state after the level of the signal output from the feedback unit reaches the first value or more, and when the notification unit notifies switching from the second voltage state to the first voltage state, the control unit changes a condition to the second switching condition of performing control of gradually decreasing the turn-on duty of the first switching element, and changes a voltage state to the first voltage state after the level of the signal output from the feedback unit reaches the second value or less.

A further aspect of the present invention is a power supply apparatus including a power supply apparatus including a transformer including a primary winding and a secondary winding, a first switching element connected in series to the primary winding of the transformer, a second switching element connected in parallel to the primary winding of the transformer, a capacitor connected in series to the second switching element, and connected in parallel to the primary winding of the transformer together with the second switching element, a smoothing and rectifying unit configured to smooth and rectify a voltage induced to the secondary winding of the transformer, a feedback unit configured to output a signal according to the voltage smoothed and rectified by the smoothing and rectifying unit, and a control unit configured to control an operation of the first switching element and the second switching element based on the signal output from the feedback unit so that the voltage smoothed and rectified by the smoothing and rectifying unit is a predetermined voltage, wherein the control is configured to implement a control operation in a first voltage state, in which the predetermined voltage is a first voltage, and in a second voltage state, in which the predetermined voltage is a second voltage larger than the first voltage, and wherein the control unit is configured to perform control of gradually changing a turn-on duty of the first switching element in one of a case in which the first voltage state is switched to the second voltage state and a case in which the second voltage state is switched to the first voltage state.

A still further aspect of the present invention is an image forming apparatus including an image forming apparatus including an image forming unit configured to form an image, and a power supply apparatus configured to supply electric power to the image forming apparatus, the power supply apparatus including a transformer including a primary winding and a secondary winding, a first switching element connected in series to the primary winding of the transformer, a second switching element connected in parallel to the primary winding of the transformer, a capacitor connected in series to the second switching element, and connected in parallel to the primary winding of the transformer together with the second switching element, a smoothing and rectifying unit configured to smooth and rectify a voltage induced to the secondary winding of the transformer, a feedback unit configured to output a signal according to the voltage smoothed and rectified by the smoothing and rectifying unit, and a control unit configured to control an operation of the first switching element and the second switching element based on the signal output from the feedback unit so that the voltage smoothed and rectified by the smoothing and rectifying unit is a predetermined voltage, wherein the control unit is configured to implement a control operation in a first voltage state, in which the predetermined voltage is a first voltage, and in a second voltage state, in which the predetermined voltage is a second voltage larger than the first voltage, and wherein the control unit is configured to perform control of gradually changing a turn-on duty of the first switching element in one of a case in which the first voltage state is switched to the second voltage state and a case in which the second voltage state is switched to the first voltage state.

Further features of the present invention will become apparent from the following description of exemplary embodiments with reference to the attached drawings.

DESCRIPTION OF THE EMBODIMENTS

Modes for carrying out the present invention are described below in detail based on embodiments with reference to the drawings.

Power Supply Apparatus

Figure 1:
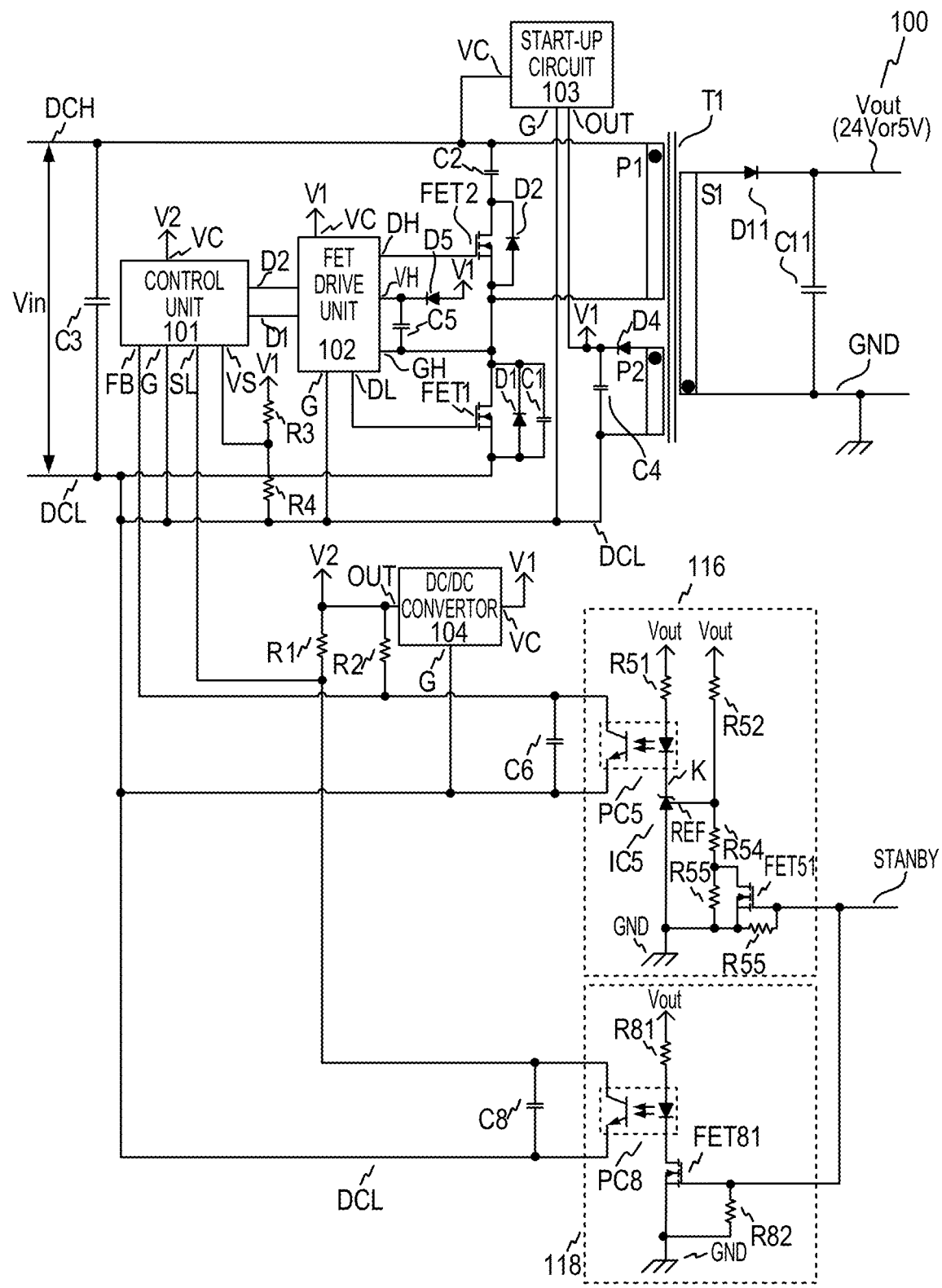
FIG. 1 is a circuit diagram of a switching power supply in a first embodiment of the present invention.

FIG. 1 is a schematic diagram of a switching power supply 100, which is a power supply apparatus employing an active clamp system, of a first embodiment of the present invention. An AC voltage Vac (not shown) is input to the switching power supply 100 from an AC power supply (not shown), for example, a commercial power supply, and is rectified by a full-wave rectifier (for example, bridge diode) (not shown). A DC voltage Vin is input to a smoothing capacitor C3 of the switching power supply 100. The switching power supply 100 is an insulating DC/DC convertor configured to supply a DC voltage stabilized from the voltage Vin input to the electrolytic capacitor as the smoothing capacitor C3 on a primary side to a voltage Vout on a secondary side. A potential on a lower side of the smoothing capacitor C3 is represented by DCL, and a potential on a higher side thereof is represented by DCH.

The switching power supply 100 includes an insulating transformer T1, which includes a primary winding P1 and an auxiliary winding P2 on the primary side and a secondary winding S1 on the secondary side. Energy is supplied from the primary winding P1 of the transformer T1 to the secondary winding S1 thereof by switching control described in FIG. 2A and FIG. 2B. The auxiliary winding P2 of the transformer T1 is used for smoothing and rectifying a forward voltage of the voltage Vin applied to the primary winding P1 with a diode D4 and a capacitor C4 to supply a power supply voltage V1.

On the primary side of the switching power supply 100, there is a field effect transistor FET1 (hereinafter simply referred to as "FET1"), which is a first switching element connected in series to the primary winding P1 of the transformer T1. Further, on the primary side of the switching power supply 100, a circuit in which a capacitor C2 for voltage clamping and an FET2, which is a second switching element, are connected in series to each other is connected in parallel to the primary winding P1 of the transformer T1. Further, on the primary side of the switching power supply 100, a control unit 101, which is a control unit for the FET1 and the FET2, and an FET drive unit 102 are arranged. A capacitor C1 for voltage resonance connected in parallel to the FET1 is arranged in order to reduce a loss at a time of switch-off of the FET1 and the FET2. A capacitance between a drain terminal and a source terminal of the FET1 may be used without arranging the capacitor C1 for voltage resonance. A diode D1 in the first embodiment is a body diode of the FET1. Similarly, a diode D2 is a body diode of the FET2.

On the secondary side of the switching power supply 100, a diode D11 and a capacitor C11 are arranged as a secondary-side smoothing and rectifying unit of a flyback voltage induced to the secondary winding S1 of the transformer T1. On the secondary side of the switching power supply 100, there is a feedback unit 116 serving as a feedback unit to be used for feeding back the voltage Vout output to the secondary side to the primary side. The feedback unit 116 outputs a signal according to the voltage Vout to the control unit 101.

The feedback unit 116 is used for controlling the voltage Vout to two constant voltages in a case in which the voltage Vout to be output serves as a first voltage of 5 V (first voltage mode) and a case in which the voltage Vout to be output serves as a second voltage of 24 V, which is larger than the first voltage (second voltage mode). The control unit 101 determines a turn-on duty of the FET1 and a cycle of a switching operation based on a signal output from the feedback unit 116. When the level of the signal from the feedback unit 116 is the same, the control unit 101 controls the turn-on duty of the FET1 in the first voltage mode to be lower than that of the FET1 in the second voltage mode. A voltage value of the voltage Vout is set based on a reference voltage of a reference terminal REF of a shunt regulator IC5 and resistances of a resistor R52, a resistor R54, and a resistor R55. When the voltage Vout becomes high, a current of a cathode terminal K of the shunt regulator IC5 increases. Therefore, a current of a secondary-side diode of a photocoupler PC5 flowing through a resistor R51 increases. Then, a primary-side transistor of the photocoupler PC5 is operated, and a discharge amount of charge from a capacitor C6 increases. Therefore, an FB terminal voltage of the control unit 101 decreases. Further, when the voltage of the voltage Vout becomes low, the discharge amount of charge from the capacitor C6 decreases. Therefore, the FB terminal voltage of the control unit 101 increases due to a current flowing from a power supply voltage V2 to the capacitor C6 through a resistor R2. The control unit 101 performs feedback control for controlling the voltage Vout to the predetermined constant voltages by detecting the FB terminal voltage. Further, in the feedback unit 116, when a STANBY signal to be input reaches a high-level state, an FET51 is turned on, and the resistor R55 is short-circuited. Therefore, a target voltage to be subjected to feedback control increases, and the feedback unit 116 is brought into a state of outputting a voltage of 24 V to the voltage Vout. A resistor R56 is connected between a gate terminal and a source terminal of the FET 51. When the STANBY signal reaches a low-level state, the FET 51 is turned off, and the resistors R54 and R55 are connected in series to each other. Therefore, the target voltage to be subjected to feedback control decreases, and the feedback unit 116 is brought into a state of outputting a voltage of 5 V to the voltage Vout.

In the first embodiment, description is given of a case in which, when the voltage of the voltage Vout becomes low, the FB terminal voltage increases, and when the voltage of the voltage Vout becomes high, the FB terminal voltage decreases. However, it is also possible to design the feedback unit 116 conversely so that, when the voltage of the voltage Vout becomes low, the FB terminal voltage decreases, and when the voltage of the voltage Vout becomes high, the FB terminal voltage increases. A switching control method for an output voltage of the present invention is also effective when the operation of the FB terminal voltage with respect to the voltage of the voltage Vout is opposite.

A switching notification unit 118, which is a notification unit, is used for notifying the control unit 101 of timing for switching between the first voltage mode corresponding to a first voltage state and the second voltage mode corresponding to a second voltage state, based on the STANBY signal to be input. When the STANBY signal reaches a high-level state, an FET81 is turned on, and a current flows to a secondary-side diode of a photocoupler PC8 through a resistor R81. After that, when a primary-side transistor of the photocoupler PC8 is operated, charge is discharged from a capacitor C8, and a low-level state of a voltage of an SL terminal of the control unit 101 can be detected. A resistor R82 is a resistor between a gate and a source of the FET81.

Meanwhile, when the STANBY signal reaches a low-level state, the capacitor C8 is charged from the power supply voltage V2 described later through a resistor R1, and a high-level state of the voltage of the SL terminal of the control unit 101 can be detected. The control unit 101 determines switching of an output voltage between the first voltage mode (SL terminal=high-level state) of outputting 5 V to the voltage Vout and the second voltage mode (SL terminal=low-level state) of outputting 24 V to the voltage Vout, based on the voltage of the SL terminal.

Figure 4:
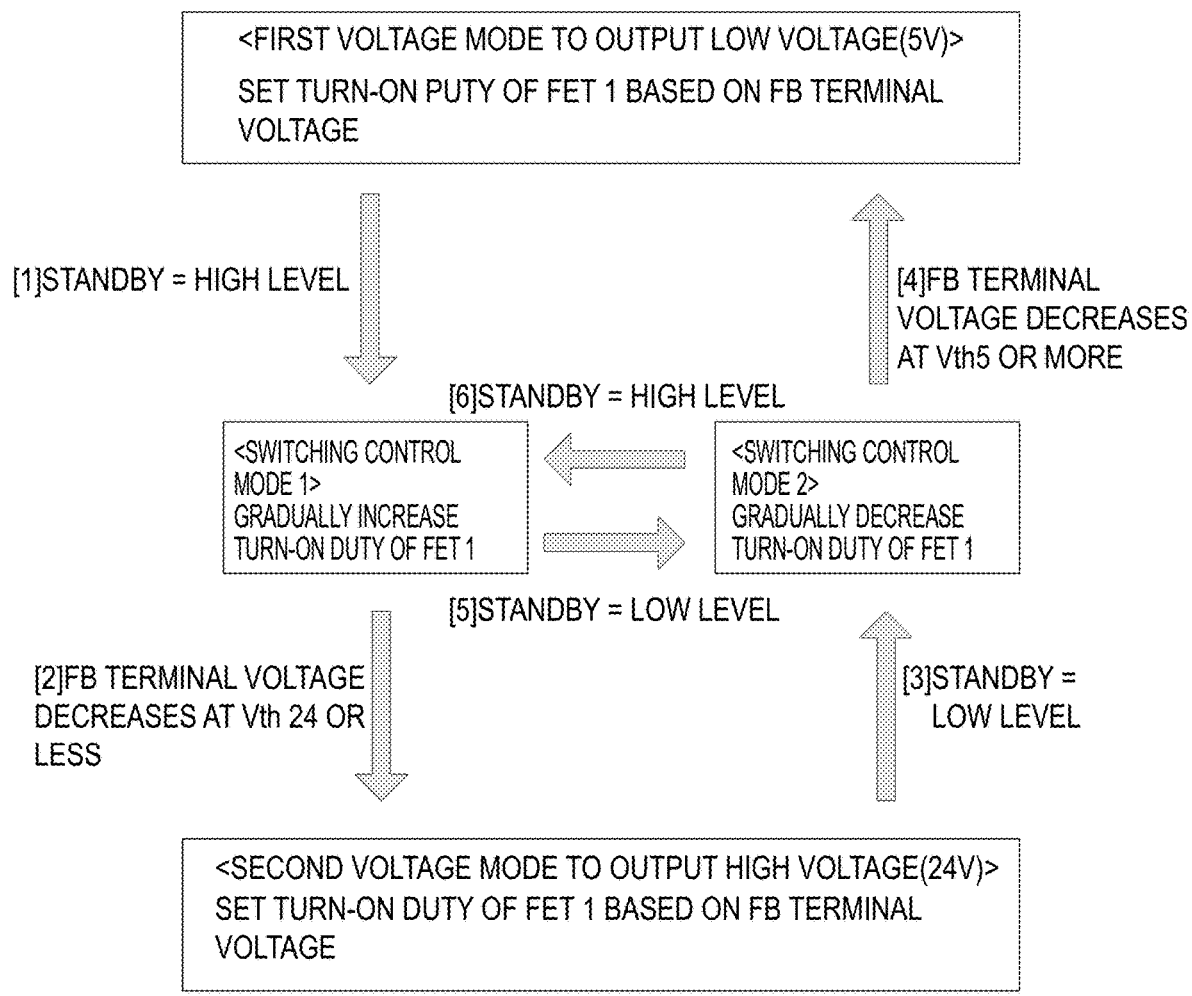
FIG. 4 is a state transition diagram of the switching power supply in the first embodiment.

In the first embodiment, as the control unit 101, a calculation control unit (for example, a CPU or an ASIC) that is operated with a clock generated by a transmitter is used. Through use of the calculation control unit that is operated with a clock as the control unit 101, a complicated control sequence as illustrated in FIG. 4 to FIG. 6 in the first embodiment can be implemented with a simple and inexpensive circuit configuration.

The power supply voltage V2, which is generated by a DC/DC convertor 104, is supplied between a VC terminal and a G terminal of the control unit 101. The control unit 101 outputs a control signal DS1 (drive signal of the FET1) and a control signal DS2 (drive signal of the FET2) based on a voltage signal input to an FB terminal, and controls the FET1 and the FET2 through the FET drive unit 102. Further, a VS terminal of the control unit 101 is a terminal to be used for detecting the voltage Vin input to the smoothing capacitor C3 by dividing the power supply voltage V1 obtained by smoothing and rectifying the forward voltage generated in the auxiliary winding P2 of the transformer T1 with the resistors R3 and R4 and detecting the resultant power supply voltage V1. The SL terminal and the FB terminal are described later.

The FET drive unit 102 is a circuit configured to generate a gate drive signal DL of the FET1 according to the control signal DS1 and a gate drive signal DH of the FET2 according to the control signal DS2. The power supply voltage V1 is supplied between a VC terminal and a G terminal of the FET drive unit 102. Further, in order to drive the FET2, the power supply voltage V1 is supplied between a VH terminal and a GH terminal of the FET drive unit 102 by a charge pump circuit formed of a capacitor C5 and a diode D5. When the control signal DS1 reaches a high-level state, the FET drive unit 102 sets the gate drive signal DL of the FET1 to a high-level state, and the FET1 is turned on. Similarly, when the control signal DS2 reaches a high-level state, the FET drive unit 102 sets the gate drive signal DH of the FET2 to a high-level state, and the FET2 is turned on.

The DC/DC convertor 104 is a three-terminal regulator or a step-down switching power supply, and outputs the power supply voltage V2 from the power supply voltage V1 input between a VC terminal and a G terminal to an OUT terminal. A start-up circuit 103 is a three-terminal regulator or a step-down switching power supply, and outputs the power supply voltage V1 from the power supply voltage Vin input between a VC terminal and a G terminal to an OUT terminal. The start-up circuit 103 is a circuit that is operated only when the power supply voltage V1 supplied from the auxiliary winding P2 has a predetermined voltage value or less, and is used for supplying the power supply voltage V1 at a time of start-up of the switching power supply 100.

Further, the control unit 101 can grasp the state of a load of the voltage Vout by monitoring the FB terminal voltage, and hence can perform appropriate control in accordance with the state of the load. Therefore, the control unit 101 functions as a detection unit configured to detect the state of the load. In order to allow the control unit 101 to determine the state of the load of the voltage Vout more accurately, a current detection unit (not shown) may be arranged in a path for supplying electric power to the FET1 and the load of the switching power supply 100.

[Relationship Between FB Terminal Voltage and Turn-on Duty of FET1]

Figure 2A:
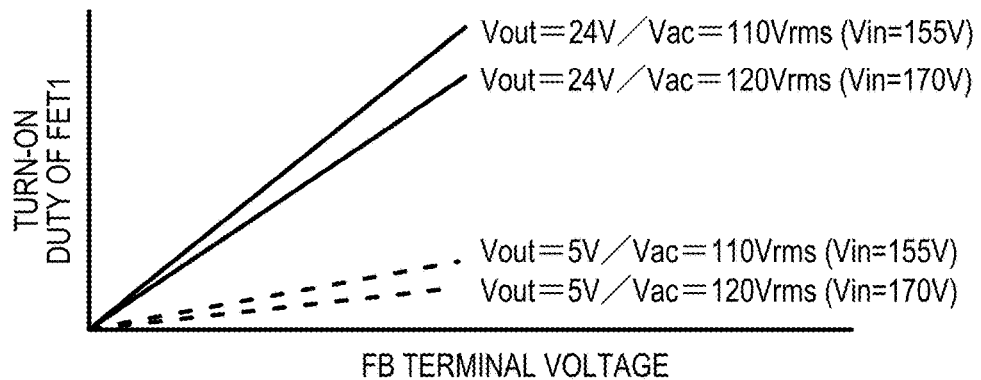
FIG. 2A and FIG. 2B are an explanatory graph and an explanatory chart of a control method for the switching power supply in the first embodiment.
Figure 2B:
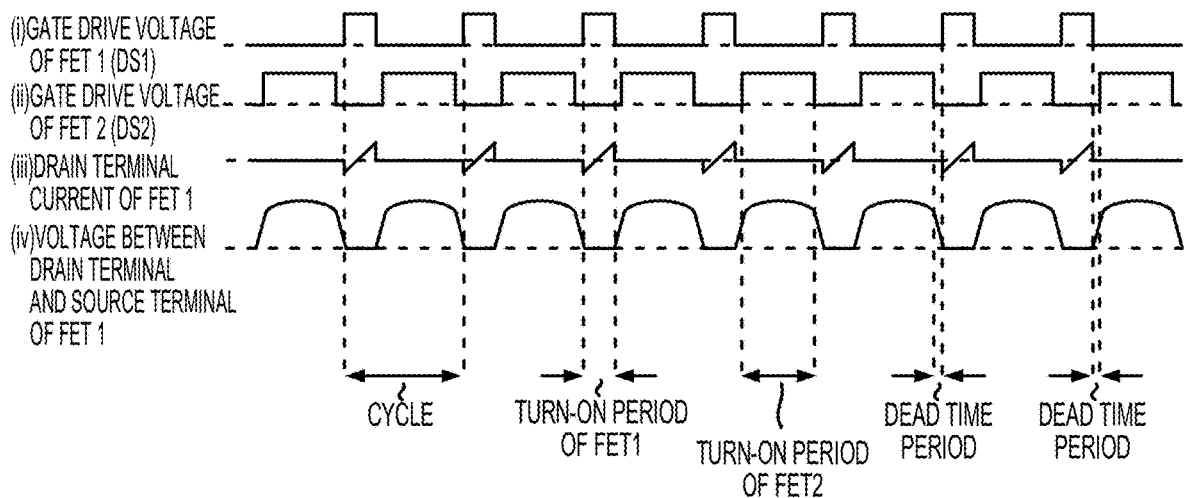

FIG. 2A and FIG. 2B are an explanatory graph and an explanatory chart of a control method for the FET1 and the FET2 by the control unit 101. FIG. 2A is a graph of a relationship between the FB terminal voltage and the turn-on duty of the FET1 in the first voltage mode (at a time of output of 5 V, represented by the dotted line) and the second voltage mode (at a time of output of 24 V, represented by the solid line). Further, the first voltage mode includes a case in which the AC voltage Vac has an effective value of 110 Vrms (voltage Vin=155 V) and a case in which the AC voltage Vac has an effective value of 120 Vrms (voltage Vin=170 V). Further, the second voltage mode includes a case in which the AC voltage Vac has an effective value of 110 Vrms (voltage Vin=155 V) and a case in which the AC voltage Vac has an effective value of 120 Vrms (voltage Vin=170 V). The turn-on duty refers to a ratio of a turn-on time period with respect to one cycle during which the FET is turned on or off.

The control unit 101 performs control of increasing the turn-on duty of the FET1 when the FB terminal voltage increases in any of the first voltage mode and the second voltage mode. Further, the voltage value of the voltage Vout is significantly different between the first voltage mode and the second voltage mode, and hence the control unit 101 performs control of increasing the turn-on duty of the FET1 in the second voltage mode as compared to that in the first voltage mode even at the same FB terminal voltage. When the relationship between the FB terminal voltage and the turn-on duty of the FET1 is optimally set in each of the first voltage mode and the second voltage mode, the resolution of the FB terminal voltage with respect to the voltage Vout can be enhanced. Further, the control unit 101 sets the relationship between the FB terminal voltage and the turn-on duty of the FET1 in each of the first voltage mode and the second voltage mode based on the voltage value of the voltage Vin detected at the VS terminal. Thus, even when the voltage Vin is different, the turn-on duty of the FET1 can be optimally controlled. FIG. 2A is a graph of a relationship between the FB terminal voltage and the turn-on duty of the FET1 at a time when the AC voltage Vac is 110 Vrms and 120 Vrms. Specifically, when the voltage value of the AC voltage Vac is high, the control unit 101 performs control of decreasing the turn-on duty of the FET1 as compared to a case in which the voltage value of the AC voltage Vac is low, by setting the turn-on time period of the FET1 to be short.

In FIG. 2B, a switching operation using the FET1 and the FET2 is described. In (i) of FIG. 2B, there is illustrated a waveform of a gate drive voltage of the FET1, that is, the control signal DS1, and in (ii) of FIG. 2B, there is illustrated a waveform of a gate drive voltage of the FET2, that is, the control signal DS2. In (iii) of FIG. 2B, there is illustrated a waveform of a current flowing through the drain terminal of the FET1, and in (iv) of FIG. 2B, there is illustrated a waveform of a voltage between the drain terminal and the source terminal of the FET1. The control unit 101 repeatedly controls the turn-on time period of the FET1 and the turn-on time period of the FET2 by alternately turning on or off the FET1 and the FET2 with a dead time being interposed. An operation of alternately turning on or off the FET1 and the FET2 repeatedly with a dead time being interposed is referred to as a continuous operation. Further, the dead time refers to a time period during which neither of the FET1 and the FET2 is turned on. The waveform of the control signal DS1 represents a waveform of the gate drive voltage of the FET1, and the waveform of the control signal DS2 represents a waveform of the gate drive voltage of the FET2.

As illustrated in FIG. 2B, during the turn-on time period of the FET1, a current flows between the drain terminal and the source terminal of the FET1, and energy is supplied to the transformer T1. It is required to increase the energy supplied to the transformer T1 by elongating the turn-on time period of the FET1 as the load of the voltage Vout increases.

During the turn-on time period of the FET2, the energy is supplied from the secondary winding S1 of the transformer T1 to the circuit on the secondary side. Then, together with this, as illustrated in FIG. 2B, through a resonant operation of the capacitor C2 for voltage clamping and the transformer T1, a resonant voltage waveform is applied between the drain terminal and the source terminal of the FET1. It is desired that the turn-on time period of the FET2 be appropriately set in accordance with the voltage value and the load of the voltage Vout. As the load of the voltage Vout increases, a time period required for supplying the energy from the secondary winding S1 of the transformer T1 to the circuit on the secondary side becomes longer. Therefore, it is required to set the turn-on time period of the FET2 to be long. Further, when the voltage value of the voltage Vout is low, the voltage of the secondary winding S1 decreases, and a time period required for supplying the energy to the circuit on the secondary side becomes long. Therefore, it is required to set the turn-on time period of the FET2 to be long. For this reason, when the load of the voltage Vout is heavy or when the voltage value of the voltage Vout is low, the control unit 101 performs control of elongating the turn-on time period of the FET2.

TABLE 1

| | Vout | Turn-on duty of FET1 | Turn-on time period of FET1 | Turn-on time period of FET2 |
|---|---|---|---|---|
| First voltage mode | 5 V | Small | Short | Long |
| Second voltage mode | 24 V | Large | Long | Short |

Comparison at FB terminal voltage of 1.5 V and Vac=110 Vrms (Vin=155 V)

In Table 1, the above-mentioned features of switching control in the first voltage mode and the second voltage mode are summarized. In Table 1, comparison of switching control is made between the first voltage mode and the second voltage mode under a condition in which the FB terminal voltage and the VS terminal voltage are the same. As an example, there is given a case in which the FB terminal voltage is set to 1.5 V, and the AC voltage Vac has an effective value of 110 Vrms (voltage Vin=155 V). In the second voltage mode, the switching power supply 100 is in a standby state, and the load of the voltage Vout basically increases. Thus, in order to supply larger energy to the transformer T1, the turn-on time period of the FET1 is set to be longer than that in the first voltage mode.

As described above, in the first voltage mode, the voltage value of the voltage Vout is about ⅕ as compared to that of the second voltage mode. When the turn-on time period of the FET1 is the same, it is required to elongate the turn-on time period of the FET2 by about 5 times in the first voltage mode as compared to that of the second voltage mode. Therefore, in the first voltage mode, the turn-on time period of the FET2 is set to be longer than that in the second voltage mode. Further, as shown in FIG. 2A, the turn-on duty of the FET1 in the first voltage mode is smaller than that in the second voltage mode. The features shown in Table 1 are examples for describing the control sequence example of FIG. 5A, FIG. 5B, and FIG. 6, and the switching control method for an output voltage of the present invention is also applicable to a case to which the features of Table 1 do not apply.

As described in FIG. 2A and FIG. 2B, the turn-on duty of the FET1 and the like are significantly different between the first voltage mode and the second voltage mode. Therefore, when switching control of the first voltage mode and the second voltage mode is performed, the following problems occur. That is, when the turn-on time period of the FET1 and the turn-on time period of the FET2 are changed abruptly with the same gain as that of normal feedback control, overshoot and undershoot occur in the voltage Vout. Further, the switching control becomes unstable, and there is a risk in that a through-current may flow during a reverse recovery time of the diode described in FIG. 3A and FIG. 3B.

[Regarding Through-Current]

Figure 3A:
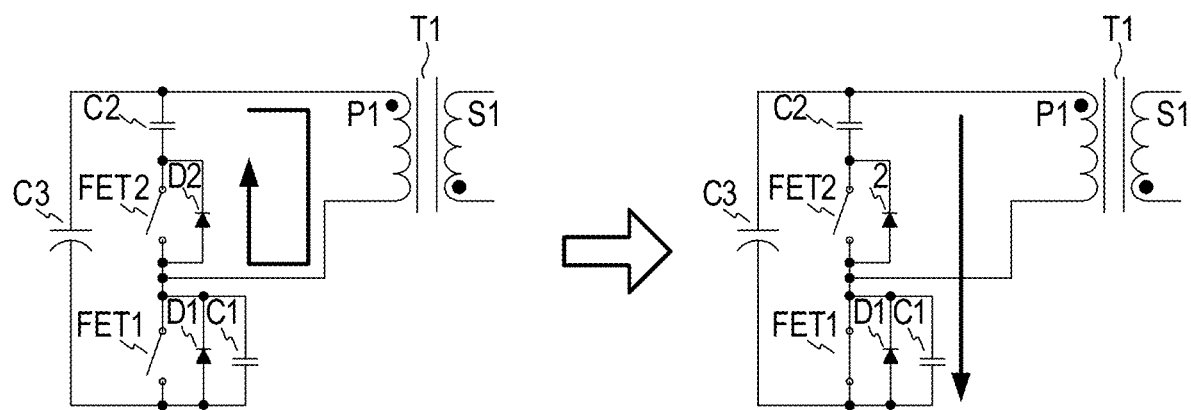
FIG. 3A and FIG. 3B are each an explanatory diagram for illustrating a state in which a through-current flows through the switching power supply in the first embodiment.
Figure 3B:
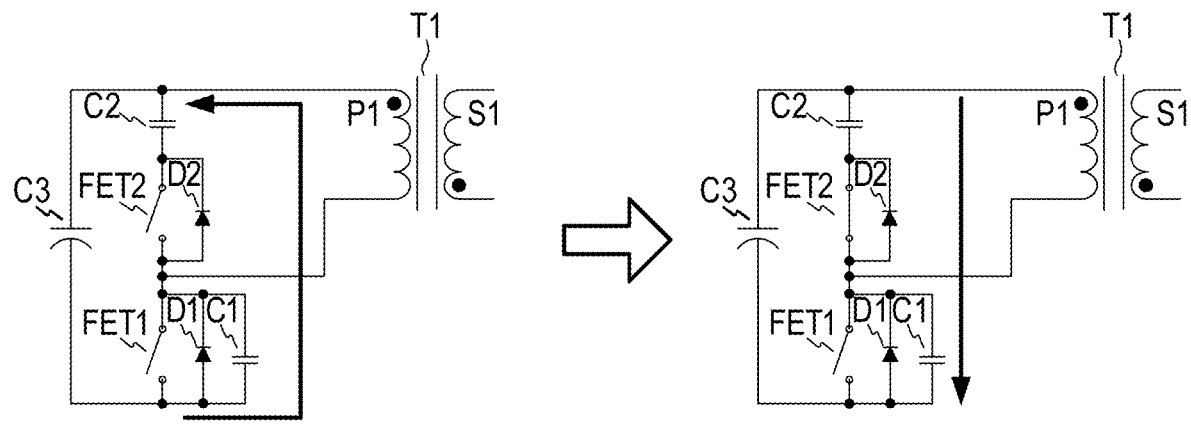

In FIG. 3A and FIG. 3B, a through-current during a reverse recovery time of the body diodes of the FET1 and the FET2 is illustrated through use of schematic diagrams for illustrating main portions of the switching power supply 100 of FIG. 1. In the left figure of FIG. 3A, both the FET1 and the FET2 are in a non-conductive state, and the body diode D2 of the FET2 is in a conductive state. The right figure of FIG. 3A is an explanatory diagram for illustrating a case in which the FET1 is turned on during conduction of the body diode D2 of the FET2, and a through-current flows during a reverse recovery time of the body diode D2.

Similarly, in the left figure of FIG. 3B, both the FET1 and the FET2 are in a non-conductive state, and the body diode D1 of the FET1 is in a conductive state. The right figure of FIG. 3B is an explanatory diagram for illustrating a case in which the FET2 is turned on during conduction of the body diode D1 of the FET1, and a through-current flows during a reverse recovery time of the body diode D1.

As described above, when a through-current flows during a reverse recovery time of the diode, an abrupt current change occurs, and the FET1 and the FET2 malfunction, with the result that there is a risk in that the switching power supply 100 may have a failure. The first embodiment has an object of preventing overshoot and undershoot of the voltage Vout and preventing a switching condition in which a through-current described in FIG. 3A and FIG. 3B flows by performing switching control of the voltage Vout described in FIG. 4 to FIG. 6.

[State Transition of Switching Power Supply]

FIG. 4 is a state transition diagram of the switching power supply 100 in the switching control of the voltage Vout. The control unit 101 sets the turn-on duty of the FET1 based on the FB terminal voltage in the first voltage mode to output the low voltage Vout (for example, 5 V). When the control unit 101 detects that the STANBY signal is in a high-level state in the first voltage mode [1], the control unit 101 transitions to a switching control mode 1, which is a first switching condition, in order to change a mode from the first voltage mode to the second voltage mode.

Figure 5A:
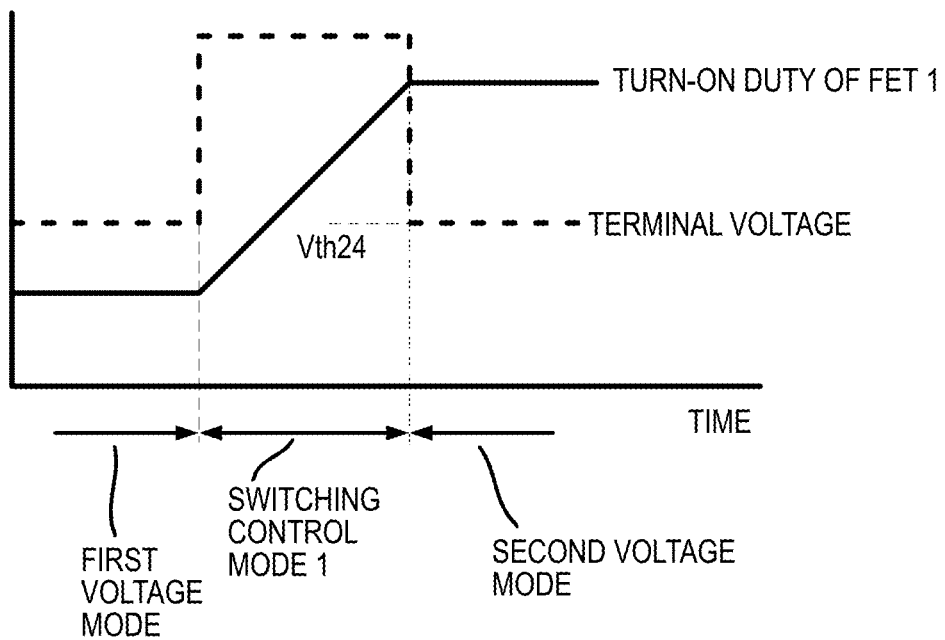
FIG. 5A and FIG. 5B are each an explanatory graph of a switching control mode of an output voltage in the first embodiment.
Figure 6:
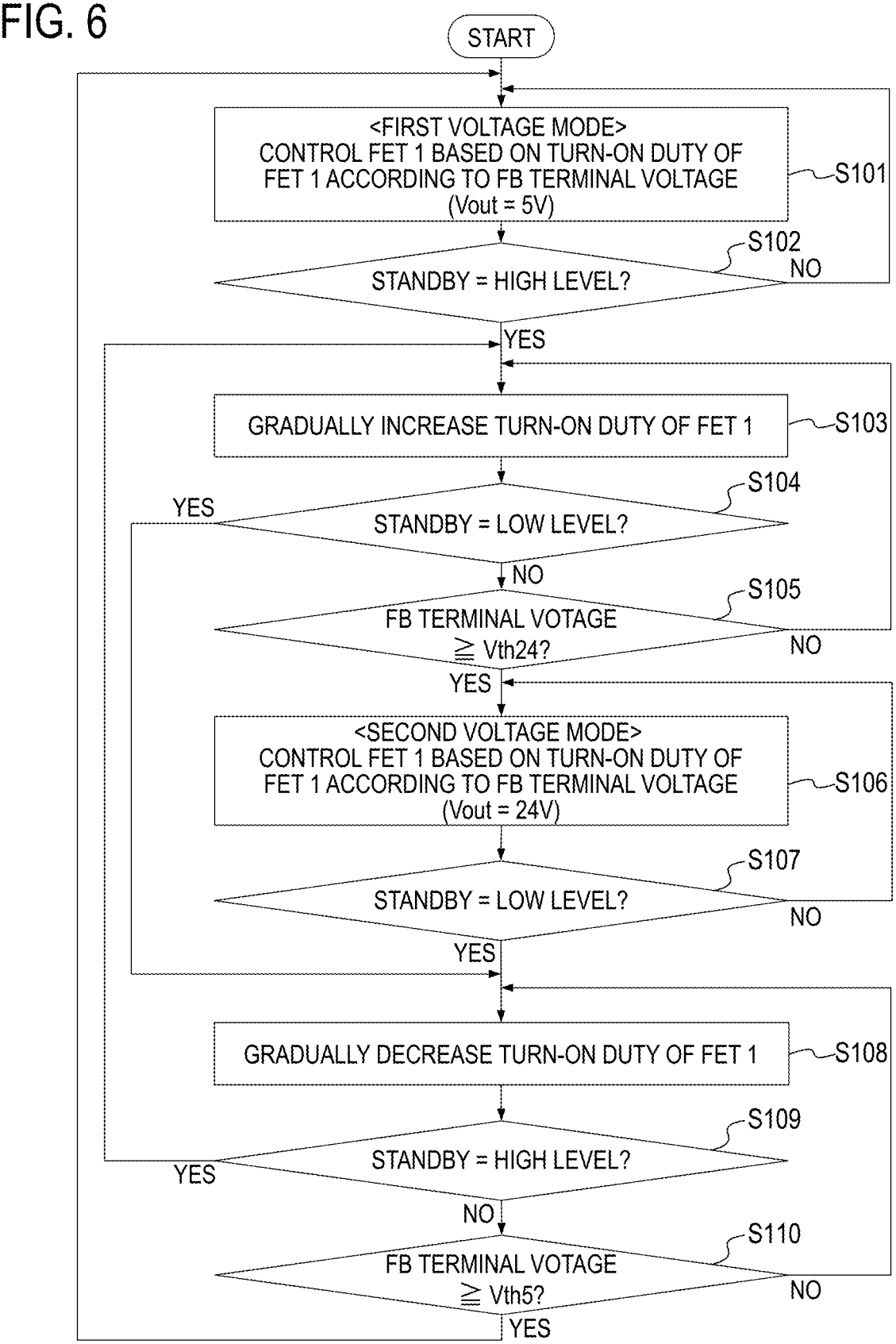
FIG. 6 is a flowchart for illustrating switching control of the output voltage in the first embodiment.

FIG. 5A is a graph for showing a state in which the control unit 101 changes a mode from the first voltage mode to the second voltage mode through the switching control mode 1 in order to change a mode from the first voltage mode to the second voltage mode. The horizontal axis of FIG. 5A represents a time, and also represents a period of each mode. Further, the vertical axis of FIG. 5A represents the turn-on duty of the FET1 with the solid line and the FB terminal voltage with the broken line. As shown in FIG. 5A, in the switching control mode 1, the control unit 101 gradually increases the turn-on duty of the FET1 at a sufficiently low speed to increase the voltage Vout. In this case, the feedback unit 116 is in a state of outputting an output of 24 V (second voltage mode). Therefore, the voltage Vout is in a state of insufficient voltage, and the FB terminal voltage increases to a maximum value. It is understood that the FB terminal voltage represented by the broken line in FIG. 5A reaches a maximum value during a period of the switching control mode 1.

When the voltage Vout reaches the voltage of the second voltage mode, the FB terminal voltage starts decreasing. When the FB terminal voltage reaches Vth24 (first value) or less, the control unit 101 transitions from the switching control mode 1 to the second voltage mode [2]. The control unit 101 sets the turn-on duty of the FET1 based on the FB terminal voltage in the second voltage mode to output the high voltage Vout (for example, 24 V). When the control unit 101 detects that the STANBY signal is in a low-level state in the second voltage mode [3], the control unit 101 transitions to a switching control mode 2, which is a second switching condition, in order to change a mode from the second voltage mode to the first voltage mode.

Figure 5B:
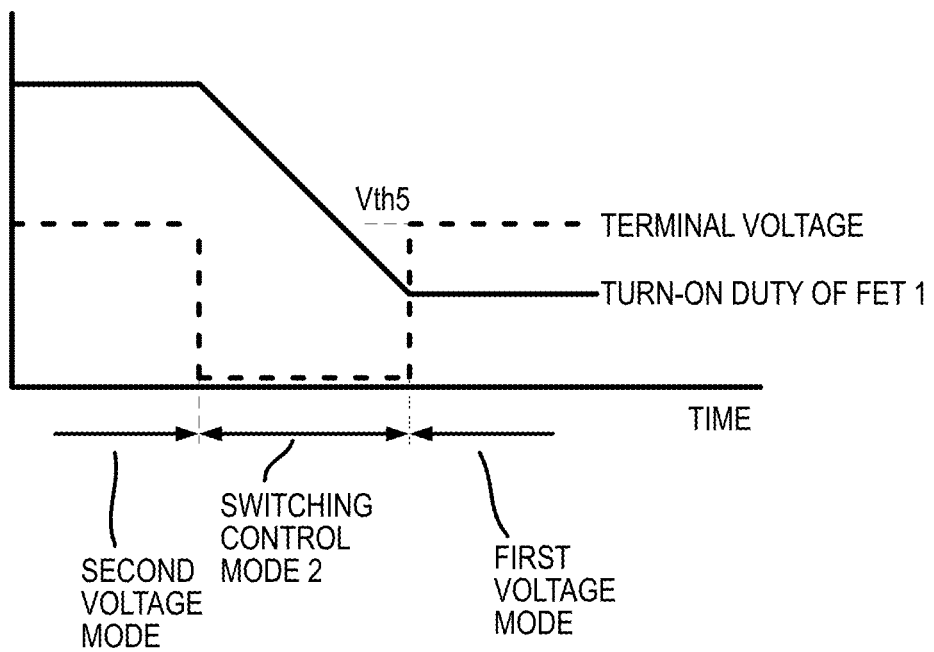

FIG. 5B is a graph for showing a state in which the control unit 101 changes a mode from the second voltage mode to the first voltage mode through the switching control mode 2 in order to change a mode from the second voltage mode to the first voltage mode. The horizontal axis of FIG. 5B represents a time, and also represents a period of each mode. The vertical axis of FIG. 5B represents the turn-on duty of the FET1 and the FB terminal voltage. As shown in FIG. 5B, in the switching control mode 2, the control unit 101 gradually decreases the turn-on duty of the FET1 at a sufficiently low speed to decrease the voltage Vout. In this case, the feedback unit 116 is in a state of outputting an output of 5 V (first voltage mode). Therefore, the voltage Vout is in a state of excessive voltage, and the FB terminal voltage decreases to a lower limit value. It is understood that the FB terminal voltage represented by the broken line in FIG. 5B reaches a minimum value during a period of the switching control mode 2. When the voltage Vout decreases to the voltage of the first voltage mode, the FB terminal voltage starts increasing. When the FB terminal voltage reaches Vth5 (second value) or more, the control unit 101 transitions from the switching control mode 2 to the first voltage mode [4].

Further, when the control unit 101 detects that the STANBY signal is in a low-level state during control of the switching control mode 1 [5], the control unit 101 changes a mode to the switching control mode 2. Similarly, when the control unit 101 detects that the STANBY signal is in a high-level state during control of the switching control mode 2 [6], the control unit 101 changes a mode to the switching control mode 1. Through this control, the control unit 101 can also support the case in which the STANBY signal changes in each of the switching control modes.

Further, in the switching control mode 1 and the switching control mode 2, a speed at which the turn-on duty of the FET1 is changed may be made variable based on the above-mentioned state of the load detected by the control unit 101, which is a detection unit of the load of the voltage Vout. For example, in the switching control mode 2, a time period during which charge of the capacitor C11 is discharged varies depending on the load of the voltage Vout. Therefore, when the load of the voltage Vout is heavy, the speed at which the turn-on duty of the FET1 is changed in the switching control mode 2 may be controlled to increase. Similarly, in the switching control mode 1, it is required to supply electric power to the load of the voltage Vout in addition to electric power required for charging the capacitor C11. Therefore, when the load of the voltage Vout is heavy, the speed at which the turn-on duty of the FET1 is changed in the switching control mode 1 may be controlled to decrease.

Further, in the switching control mode 1 and the switching control mode 2, the speed at which the turn-on duty of the FET1 is changed may not be a constant speed. For example, in order to reduce a time period to be taken in each of the switching control modes while preventing overshoot and undershoot of the voltage Vout, the following control may be performed. That is, the speed at which the turn-on duty of the FET1 is changed may be set to be high in a former half of the switching control mode 1 and the switching control mode 2, and the speed at which the turn-on duty of the FET1 is changed may be set to be low in a latter half thereof.

As described above, in the first embodiment, the switching notification unit 118 notifies the control unit 101 of switching between the first voltage mode and the second voltage mode with the STANBY signal, and performs the switching control sequence described in FIG. 4, FIG. 5A, and FIG. 5B. With this, an abrupt change in the voltage Vout and a fluctuation in switching waveform can be prevented, and it is possible to prevent overshoot and undershoot of the voltage Vout and the switching condition in which a through-current flows described in FIG. 3A and FIG. 3B.

[Control Processing of Switching Power Supply]

FIG. 6 is a flowchart for illustrating a control sequence of the switching power supply 100 by the control unit 101 in the first embodiment. When the switching power supply 100 is supplied with the voltage Vin, the control unit 101 starts control in Step (hereinafter abbreviated as "S") 101 and the subsequent steps. In S101, the control unit 101 controls the FET1 based on the turn-on duty of the FET1 according to the FB terminal voltage in the first voltage mode, and continues the state of outputting 5 V to the voltage Vout. In S102, the control unit 101 determines whether or not the STANBY signal supplied from outside of the switching power supply 100 is in a high-level state. When the control unit 101 determines in S102 that the STANBY signal is in a high-level state, the control unit 101 advances the flow to S103, and transitions from the first voltage mode to the switching control mode 1. When the control unit 101 determines in S102 that the STANBY signal is not in a high-level state, that is, the STANBY signal is in a low-level state, the control unit 101 returns the flow to S101, and continues the first voltage mode.

In S103, the control unit 101 performs control of gradually increasing the turn-on duty of the FET1 in the switching control mode 1. In S104, the control unit 101 determines whether or not the STANBY signal supplied from outside of the switching power supply 100 is in a low-level state. When the control unit 101 determines in S104 that the STANBY signal is in a low-level state, the control unit 101 advances the flow to S108, and transitions from the switching control mode 1 to the switching control mode 2. When the control unit 101 determines in S104 that the STANBY signal is not in a low-level state, that is, the STANBY signal is in a high-level state, the control unit 101 advances the flow to S105.

In S105, the control unit 101 determines whether or not the FB terminal voltage has decreased to Vth24 as a first value stored in a memory (not shown) in the control unit 101, or less. When the operation of the FB terminal voltage is opposite, the control unit 101 determines whether or not the FB terminal voltage has increased to Vth24 (the first value) or more. When the control unit 101 determines in S105 that the FB terminal voltage is Vth24 or less, the control unit 101 advances the flow to S106, and transitions from the switching control mode 1 to the second voltage mode. When the control unit 101 determines in S105 that the FB terminal voltage is larger than Vth24, the control unit 101 returns the flow to S103, and continues the switching control mode 1.

In S106, the control unit 101 controls the FET1 based on the turn-on duty of the FET1 according to the FB terminal voltage in the second voltage mode, and continues the state of outputting 24 V to the voltage Vout. In S107, the control unit 101 determines whether or not the STANBY signal supplied from outside of the switching power supply 100 is in a low-level state. When the control unit 101 determines in S107 that the STANBY signal is in a low-level state, the control unit 101 advances the flow to S108, and transitions from the second voltage mode to the switching control mode 2. When the control unit 101 determines in S107 that the STANBY signal is not in a low-level state, that is, the STANBY signal is in a high-level state, the control unit 101 returns the flow to S106, and continues the second voltage mode.

In S108, the control unit 101 performs control of gradually decreasing the turn-on duty of the FET1 in the switching control mode 2. In S109, the control unit 101 determines whether or not the STANBY signal supplied from outside of the switching power supply 100 is in a high-level state. When the control unit 101 determines in S109 that the STANBY signal is in a high-level state, the control unit 101 returns the flow to S103, and transitions from the switching control mode 2 to the switching control mode 1. When the control unit 101 determines in S109 that the STANBY signal is not in a high-level state, that is, the STANBY signal is in a low-level state, the control unit 101 advances the flow to S110.

In S110, the control unit 101 determines whether or not the FB terminal voltage has increased to Vth5 as the second value) stored in the memory (not shown) in the control unit 101, or more. When the operation of the FB terminal voltage is opposite, the control unit 101 determines whether or not the FB terminal voltage has decreased to Vth5 (second value) or less. When the control unit 101 determines in S110 that the FB terminal voltage is Vth5 or more, the control unit 101 returns the flow to S101, and transitions from the switching control mode 2 to the first voltage mode. When the control unit 101 determines in S110 that the FB terminal voltage is smaller than Vth5, the control unit 101 returns the flow to S108, and continues the switching control mode 2. The control unit 101 performs switching control of the voltage Vout of the switching power supply 100 by repeating the control in the above-mentioned steps S101 to S110.

In the first embodiment, description is given under the condition in which the threshold values Vth5 and Vth24 of the FB terminal voltage are fixed values. However, the threshold values Vth5 and Vth24 may be variable values according to the voltage value of the input voltage Vin and the load to the output voltage Vout.

The control method for the switching power supply 100 in the first embodiment has the following features.

The control unit 101 has the first voltage mode to output a low voltage and the second voltage mode to output a high voltage.

The switching power supply 100 includes the switching notification unit 118 for switching between the first voltage mode and the second voltage mode.

The control unit 101 has the switching control mode for performing transition between the first voltage mode and the second voltage mode (the control unit 101 invalidates the control by the FB terminal voltage, and performs control of gradually increasing or decreasing the turn-on duty of the FET1.)

The control unit 101 ends the switching control mode when the FB terminal voltage reaches a predetermined voltage value or more or when the FB terminal voltage reaches a predetermined voltage value or less, and transitions to the first voltage mode or the second voltage mode.

Through use of the above-mentioned control method in the first embodiment, overshoot and undershoot of the output from the switching power supply can be prevented, and further a through-current can be prevented from flowing through the switching element, with the result that the reliability of the switching power supply can be enhanced. As described above, according to the first embodiment, when the output voltage of the switching power supply is controlled to be changed, overshoot and undershoot can be prevented, and a through-current can be prevented from flowing through the switching element.

Next, a control method for the switching power supply 100 of a second embodiment of the present invention is described. The same configurations as those of the first embodiment are denoted by the same reference symbols, and description thereof is omitted. The control method for the switching power supply 100 in the second embodiment described with reference to FIG. 7A to FIG. 9 is different from that in the first embodiment in that, when the load of the voltage Vout is low in the first voltage mode, intermittent control is performed in order to improve power supply efficiency. Further, the control method for the switching power supply 100 in the second embodiment is different from that in the first embodiment in that, there is Step 1, which is first control of elongating a cycle in the switching control mode 1, and that there is a prohibition period of the intermittent control in the switching control mode 2.

[Control Method for FET1 and FET2]

Figure 7A:
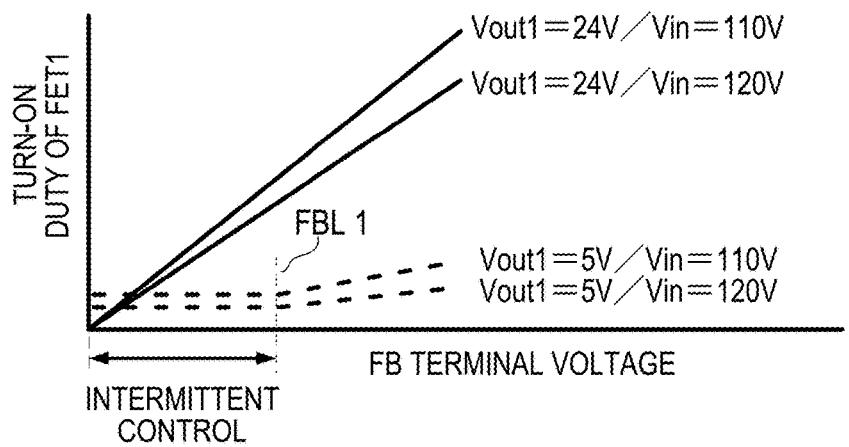
FIG. 7A and FIG. 7B are an explanatory graph and an explanatory chart of a control method for a switching power supply in a second embodiment of the present invention.
Figure 7B:
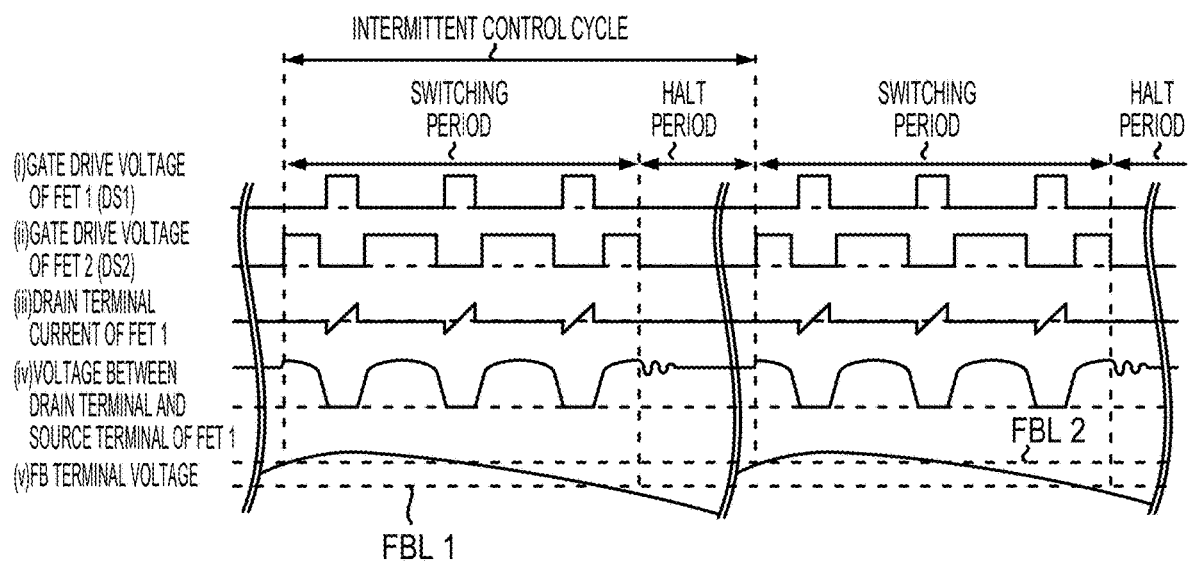

FIG. 7A and FIG. 7B are an explanatory graph and an explanatory chart of the control method for the FET1 and the FET2 by the control unit 101. In FIG. 7A, the horizontal axis represents the FB terminal voltage, and the vertical axis represents the turn-on duty of the FET, with the solid line indicating the case in which a voltage Vout1 is 24 V and the broken line indicating the case in which the voltage Vout1 is 5 V. Further, in the same manner as in FIG. 2A, FIG. 7A is a graph for showing the case in which the input voltage Vin is different in each of the modes. In FIG. 7A, when the FB terminal voltage decreases to a voltage value FBL1, which is a first level stored in the memory (not shown) included in the control unit 101, in the first voltage mode (at a time of output of 5 V, represented by the broken line), intermittent control described in FIG. 7B is performed. This point is different from the control method in the first embodiment. When the load of the voltage Vout is light in the first voltage mode, by performing the intermittent control described in FIG. 7B, a switching loss of the FET1 and the FET2 is reduced and the power supply efficiency of the switching power supply 100 can be improved.

In FIG. 7B, description is given of control in an intermittent operation (hereinafter referred to as "intermittent control") of repeating a switching period, which is a first period, and a halt period, which is a second period. In FIG. 7B, graphs (i) to (iv) are similar to the graphs (i) to (iv) of FIG. 2B, and hence description thereof is omitted. In FIG. 7B, a graph (v) represents the FB terminal voltage, and the voltage value FBL1, which is a first level, and a voltage value FBL2, which is a second level, are each represented by an alternate long and short dash line.

In a light load state of the switching power supply 100, the intermittent control of repeating the switching period and the halt period of halting the switching operation is performed as shown in FIG. 7B. With this, the current on the primary side of the switching power supply 100 and the number of switching of the FET1 and the FET2 can be reduced to improve the power supply efficiency in the light load state of the switching power supply 100. In the second embodiment, when the FB terminal voltage becomes lower than the voltage value FBL1, it is determined that the switching power supply 100 is brought into a light load state, and movement to the halt period is performed. When the FB terminal voltage becomes larger than the voltage value FBL2, which is the second level stored in the memory (not shown) included in the control unit 101, after the movement to the halt period, a period is moved from the halt period to the switching period again. In the switching power supply 100, the voltage value FBL2 is set to a voltage larger than the voltage value FBL1 (FBL2>FBL1). Then, the intermittent control shown in FIG. 7B is implemented through use of overshoot and undershoot of the FB terminal voltage. A cycle during which the switching period and the halt period are repeatedly controlled in this case is referred to as an intermittent control cycle. As a method of determining the light load state of the switching power supply 100, as described above, a method of arranging a current detection unit (not shown) in a path for supplying electric power to the FET1 and the load of the switching power supply 100 may be used.

[Switching Control Mode]

Figure 8A:
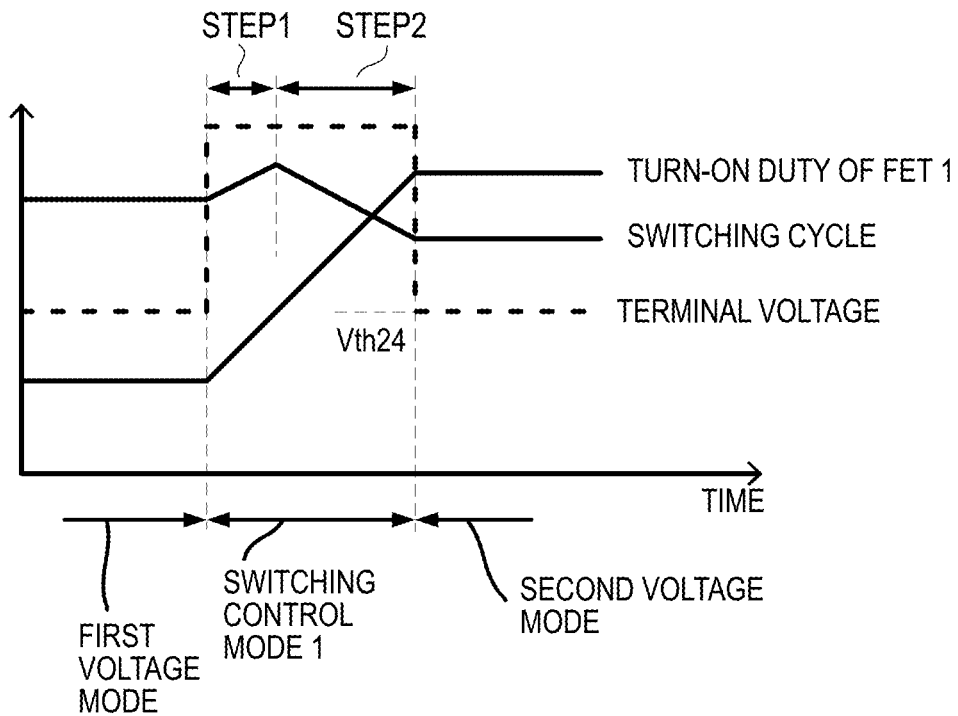
FIG. 8A and FIG. 8B are each an explanatory graph of a switching control mode of an output voltage in the second embodiment.
Figure 8B:
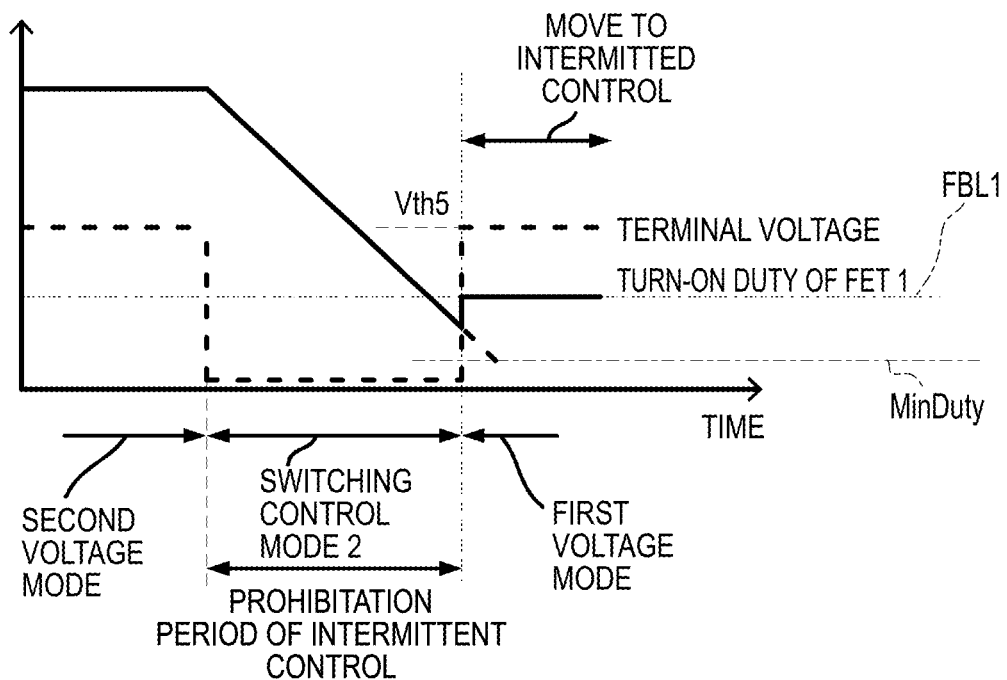

FIG. 8A and FIG. 8B are each an explanatory graph of a switching control mode of the voltage Vout. When the control unit 101 detects that the STANBY signal is in a high-level state in the first voltage mode to output 5 V to the voltage Vout, the control unit 101 transitions to the switching control mode 1 in order to change a mode from the first voltage mode to the second voltage mode. The switching control mode 1 described in the second embodiment is characterized in that the control mode is divided into two-stage controls, Step 1 as the first control, and Step 2 as the second control, as shown in FIG. 8A and FIG. 8B.

In FIG. 8A and FIG. 8B, the horizontal axis represents a time, and the vertical axis represents the turn-on duty of the FET1 with the thick solid line, the switching cycle that is the cycle of the switching operation with the thin solid line, and the FB terminal voltage with the broken line. In the switching control mode 1, the voltage Vout is increased by gradually increasing the turn-on duty of the FET1 at a speed sufficiently lower than that of normal feedback control. In Step 1 of the switching control mode 1, the turn-on duty of the FET1 is increased by elongating the turn-on time period of the FET1, and hence Step 1 has a feature in that the switching cycle becomes long. Meanwhile, in Step 2 of the switching control mode 1, the turn-on duty of the FET1 is increased by shortening the turn-on time period of the FET2, and hence the switching cycle becomes short as a whole. As shown in FIG. 8A, the switching cycle becomes long in Step 1, and becomes short in Step 2.

As an advantage obtained by elongating the switching cycle in Step 1 of the switching control mode 1, there is given the following. When the switching cycle is elongated, a switching waveform suitable for the case in which the load of the voltage Vout is heavy is obtained as described in the first embodiment. When the load of the voltage Vout is heavy in the switching control mode 1, switching control that is also suitable for a heavy load can be performed by performing control in Step 1 of the switching control mode 1.

In Step 2 of the switching control mode 1, although the switching cycle becomes short, the voltage value of the voltage Vout increases, and hence the voltage of the secondary winding S1 increases. Therefore, the switching control mode 1 can also support the case in which the load of the voltage Vout is heavy. Accordingly, it is effective to perform the control in Step 1 of elongating the frequency of switching control and then perform control in Step 2 of shortening the frequency in the switching control mode 1.

When the control unit 101 detects that the STANBY signal is in a low-level state in the second voltage mode to output 24 V to the voltage Vout, the control unit 101 transitions from the second voltage mode to the switching control mode 2. In the switching control mode 2, the voltage Vout is decreased by gradually decreasing the turn-on duty of the FET1 at a speed sufficiently lower than that of normal feedback control as shown in FIG. 8B. In FIG. 8B, the horizontal axis represents a time, and the vertical axis represents the turn-on duty of the FET1 with the solid line and the FB terminal voltage with the broken line.

In the switching control mode 2 in the second embodiment, the control unit 101 does not change a control to the intermittent control even when the FB terminal voltage decreases to the voltage value FBL1. The control unit 101 decreases the turn-on duty of the FET1 until the FB terminal voltage reaches Vth5 or more or the turn-on duty of the FET1 reaches a minimum duty (hereinafter referred to as "MinDuty") stored in a non-volatile memory (not shown) included in the control unit 101.

Then, the control unit 101 continues a period of prohibiting the intermittent control until the switching control mode 2 is ended. As shown in FIG. 8B, after the control unit 101 transitions to the switching control mode 2, the FB terminal voltage becomes lower than the voltage value FBL1 represented by the alternate long and short dash line. However, the intermittent control is prohibited, and hence the turn-on duty of the FET1 gradually decreases.

The value of MinDuty is a lower limit value of the turn-on duty of the FET1. When the turn-on duty of the FET1 decreases to MinDuty (alternate long and two short dashes line), which is a predetermined duty, the switching control mode 2 is ended even when the FB terminal voltage has not reached Vth5 or more.

Through setting of the prohibition period of the intermittent control in the switching control mode 2, the continuous control state described in FIG. 2B can be kept, and the responsiveness of control can be improved. Thus, through setting of the prohibition period of the intermittent control, undershoot of the voltage Vout can be prevented.

[Control Processing of Switching Power Supply]

Figure 9:
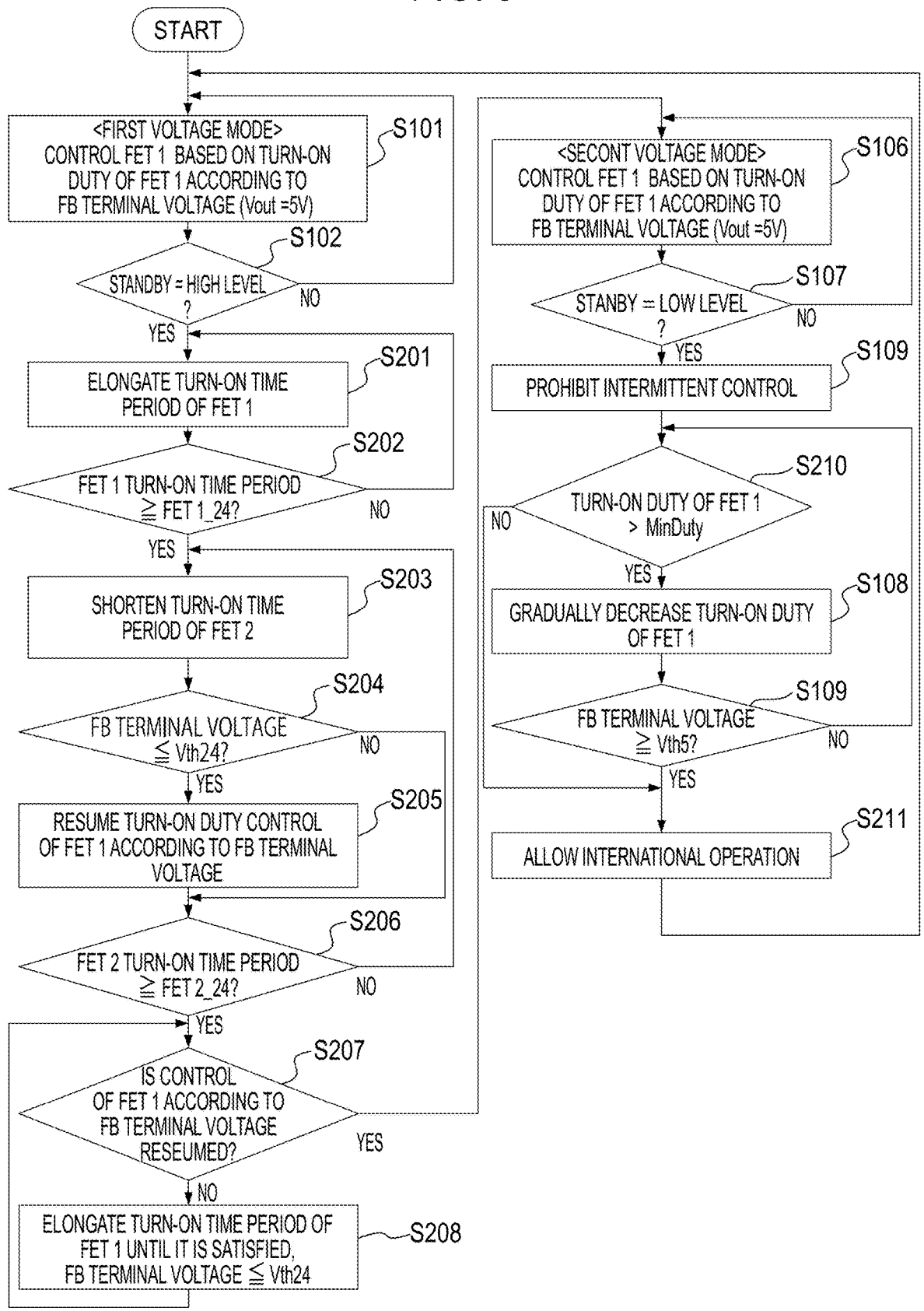
FIG. 9 is a flowchart for illustrating switching control of the output voltage in the second embodiment.

FIG. 9 is a flowchart for illustrating a control sequence of the switching power supply 100 by the control unit 101 in the second embodiment. The same control as that in the flowchart of FIG. 6 is denoted by the same reference symbol, and description thereof is omitted. When the control unit 101 detects in S102 that the STANBY signal is in a high-level state, the control unit 101 transitions from the first voltage mode to the switching control mode 1, and advances the flow to S201. In S201, the control unit 101 performs the control in Step 1 of the switching control mode 1 of gradually elongating the turn-on time period of the FET1.

In S202, the control unit 101 determines whether or not the turn-on time period of the FET1 has reached FET1_24

(predetermined time) stored in the non-volatile memory (not shown) in the control unit 101, or more. When the control unit 101 determines in S202 that the turn-on time period of the FET1 has reached FET1_24 or more, the control unit 101 advances the flow to S203. When the control unit 101 determines in S202 that the turn-on time period of the FET1 is less than FET1_24, the control unit 101 returns the flow to S201, and continues the control in Step 1 of the switching control mode 1. In S203, the control unit 101 performs the control in Step 2 of the switching control mode 1 of gradually shortening the turn-on time period of the FET2.

The processing in S204 to S205 is control for preventing overshoot at a time when the voltage Vout has reached a voltage of 24 V of the second voltage mode in Step 2 of the switching control mode 1. In S204, the control unit 101 determines whether or not the FB terminal voltage has reached Vth24 or less. When the control unit 101 determines in S204 that the FB terminal voltage has reached Vth24 or less, the control unit 101 advances the flow to S205. In S205, the control unit 101 resumes the control of the FET1 based on the turn-on duty of the FET1 according to the FB terminal voltage. When the control unit 101 determines in S204 that the FB terminal voltage is larger than Vth24, the control unit 101 advances the flow to S206.

In S206, the control unit 101 determines whether or not the turn-on time period of the FET2 has reached FET2_24 stored in the non-volatile memory (not shown) in the control unit 101, or less. When the control unit 101 determines in S206 that the turn-on time period of the FET2 has reached FET2_24 or less, the control unit 101 advances the flow to S207. When the control unit 101 determines in S206 that the turn-on time period of the FET2 is larger than FET2_24, the control unit 101 returns the flow to S203, and continues the control in Step 2 of the switching control mode 1. In S207, the control unit 101 determines whether or not the control of the FET1 based on the turn-on duty of the FET1 according to the FB terminal voltage has been resumed in S205. When the control of the FB terminal voltage by the control unit 101 has been resumed, the control unit 101 advances the flow to S106, and transitions from the switching control mode 1 to the second voltage mode.

The processing in S208 is the control in a case in which the voltage Vout has not reached a voltage of 24 V of the second voltage mode after completion of Step 2 of the switching control mode 1. In S208, the control unit 101 performs control of elongating the turn-on time period of the FET1 until the FB terminal voltage satisfies the condition in which the FB terminal voltage is Vth24 or less, and advances the processing to S106 to transit the operation mode from the switching control mode 1 to the second voltage mode.

Next, the control of the switching control mode 2 is described. When the control unit 101 detects in S107 that the STANBY signal has reached a low-level state, the control unit 101 changes a mode from the second voltage mode to the switching control mode 2. In S209, the control unit 101 prohibits the intermittent control when moving to the switching control mode 2. In S210, the control unit 101 determines whether or not the turn-on duty of the FET1 is larger than MinDuty. When the control unit 101 determines in S210 that the turn-on duty of the FET1 is larger than MinDuty, the control unit 101 advances the flow to S108. In S108, the control unit 101 performs control of gradually decreasing the turn-on duty of the FET1, and continues the switching control mode 2 until the control unit 101 detects the FB terminal voltage of Vth5 or more in S109.

When the control unit 101 determines in S210 that the turn-on duty of the FET1 is MinDuty (predetermined turn-on duty) or less, the control unit 101 ends the switching control mode 2 even when the FB terminal voltage has not reached Vth5 or more, and advances the flow to S211. After the control unit 101 allows the intermittent control in S211, the control unit 101 returns the flow to S101, and transitions to the first voltage mode.

Through repetition of the above-mentioned control, the control unit 101 performs switching control of the voltage Vout of the switching power supply 100. The control method for the switching power supply 100 in the second embodiment has the following features in addition to the features of the control method described in the first embodiment.

The control unit 101 performs the intermittent control in order to improve the power supply efficiency when the load of the voltage Vout is further low in the first voltage mode.

The control unit 101 has Step 1 of elongating the cycle in the switching control mode 1.

The control unit 101 sets the prohibition period of the intermittent control in the switching control mode 2.

Therefore, through use of the control method in the second embodiment, overshoot and undershoot of the output from the switching power supply can be prevented, and further a through-current can be prevented from flowing through the switching element, with the result that the reliability of the switching power supply can be enhanced. As described above, according to the second embodiment, when the output voltage of the switching power supply is controlled to be changed, overshoot and undershoot can be prevented, and a through-current can be prevented from flowing through the switching element.

The switching power supply 100, which is the power supply apparatus described in the first and second embodiments, is applicable, for example, as a low-voltage power supply of an image forming apparatus, that is, a power supply configured to supply electric power to a controller (control unit), a drive unit, for example, a motor, and the like. A configuration of an image forming apparatus to which the power supply apparatus according to the first and second embodiments is applied is described below.

[Configuration of Image Forming Apparatus]

Figure 10:
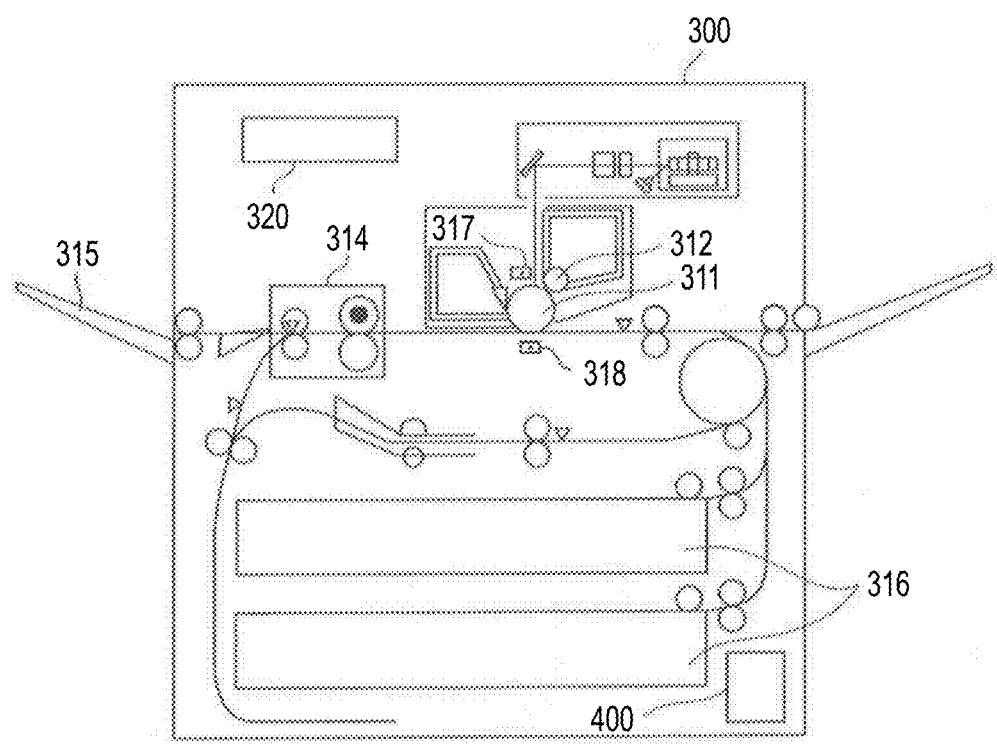
FIG. 10 is a view for illustrating a configuration of an image forming apparatus according to a third embodiment of the present invention.

As an example of an image forming apparatus, a laser beam printer is exemplified. A schematic configuration of a laser beam printer as an example of an electrophotographic printer is illustrated in FIG. 10. A laser beam printer 300 includes a photosensitive drum 311 serving as an image bearing member on which an electrostatic latent image is formed, a charging portion 317 (charging unit) configured to uniformly charge the photosensitive drum 311, and a developing portion 312 (developing unit) configured to develop the electrostatic latent image formed on the photosensitive drum 311 with a toner. A toner image developed to the photosensitive drum 311 is transferred onto a sheet (not shown) serving as a recording material supplied from a cassette 316 with a transfer portion 318 (transfer unit). The toner image transferred onto the sheet is fixed with a fixing device 314, and the sheet is delivered to a tray 315. The photosensitive drum 311, the charging portion 317, the developing portion 312, and the transfer portion 318 form an image forming unit. The laser beam printer 300 further includes a power supply apparatus 400 (switching power supply 100) described in the first and second embodiments. The image forming apparatus to which the power supply apparatus 400 according to the first and second embodiments is applicable is not limited to the laser beam printer 300 illustrated in FIG. 10, and may be, for example, an image forming apparatus including a plurality of image forming units. The image forming apparatus may further include a primary transfer portion configured to transfer the toner image on the photosensitive drum 311 onto an intermediate transfer belt and a secondary transfer portion configured to transfer the toner image on the intermediate transfer belt onto the sheet.

The laser beam printer 300 includes a controller 320 configured to control an image forming operation by the image forming unit and a sheet conveying operation, and the power supply apparatus 400 described in the first and second embodiments supplies electric power to the controller 320, for example. Further, the power supply apparatus 400 described in the first and second embodiments supplies electric power to a drive unit, for example, a motor for rotating the photosensitive drum 311 or driving various rollers configured to convey the sheet. That is, the load in the first and second embodiments corresponds to the controller 320 or the drive unit.

When the image forming apparatus according to a third embodiment of the present invention is in a standby state (for example, a power saving mode or a standby mode) for achieving power saving, power consumption can be lowered by reducing the load by, for example, supplying electric power only to the controller 320. That is, at a time of the power saving mode, the image forming apparatus of the third embodiment performs the intermittent control at a time when the power supply apparatus 400 is a light load state described in the second embodiment. Further, the STANBY signal input to the feedback unit 116 and the switching notification unit 118 in the first and second embodiments may be a signal output from the controller 320.

As described above, according to the third embodiment, it is possible to prevent overshoot and undershoot and prevent a through-current from flowing through a switching element when an output voltage of a switching power supply is controlled to be changed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-090175, filed Apr. 28, 2017, which is hereby incorporated by reference herein in its entirety.

What is claimed is:

1. A power supply apparatus comprising:
a transformer including a primary winding and a secondary winding;
a first switching element connected in series to the primary winding of the transformer;
a second switching element connected in parallel to the primary winding of the transformer;
a capacitor connected in series to the second switching element, and is connected in parallel to the primary winding of the transformer together with the second switching element;
a smoothing and rectifying unit configured to smooth and rectify a voltage induced to the secondary winding of the transformer so as to generate an output voltage;
a detecting unit configured to detect information regarding the voltage induced to the secondary winding; and
a control unit configured to control an operation of the first switching element and the second switching element so that the output voltage smoothed and rectified by the smoothing and rectifying unit becomes a first voltage according to the information detected by the detecting unit,
wherein, in a case where the output voltage is switched from the first voltage to a second voltage different from the first voltage, a value corresponding to the information detected by the detecting unit in a period in which the output voltage is switched from the first voltage to the second voltage is different from a value corresponding to the information detected by the detecting unit in a first state in which the output voltage is the first voltage, and a value corresponding to the information detected by the detecting unit in a second state in which the output voltage is the second voltage, and
wherein, in the case where the output voltage is switched from the first voltage to the second voltage different from the first voltage, the control unit is configured to perform control of a turn-on time period of the first switching element so as to gradually change the turn-on time period of the first switching element in the period in which the output voltage is switched from the first voltage to the second voltage.

2. The power supply apparatus according to claim 1, wherein, in a case where the first voltage is smaller than the second voltage, the control unit is configured to perform a control of the turn-on time period of the first switching element to gradually increase the turn-on time period of the first switching element from a turn-on time period corresponding to the first voltage to a turn-on time period corresponding to the second voltage.

3. The power supply apparatus according to claim 1, wherein, in a case where the first voltage is larger than the second voltage, the control unit is configured to perform a control of the turn-on time period of the first switching element to gradually decrease the turn-on time period of the first switching element from a turn-on time period corresponding to the first voltage to a turn-on time period corresponding to the second voltage.

4. The power supply apparatus according to claim 1, wherein, in a case where the first voltage is larger than the second voltage, the control unit is configured to perform a control so that the first and second switching elements are continuously and alternately turned on and off to output the first voltage, and so that control patterns are repeated to output the second voltage between a control pattern in which the first and second switching elements are continuously and alternately turned on and off and a control pattern in which both the first and second switching elements are turned off.

5. The power supply apparatus according to claim 1, wherein, in a case where the output voltage is the first voltage or the second voltage, the control unit controls the operation of the first switching element and the second switching element according to the value corresponding to the information detedted by the detecting unit, and
wherein, in a period in which the output voltage is switched from the first voltage to the second voltage, the control unit is configured to gradually change the turn-on time period of the first switching element.

6. The power supply apparatus according to claim 1, wherein the turn-on time period of the first switching element is defined as a period in which the switching element is turned on in one cycle as a set of turn-on and off.

7. The power supply apparatus according to claim 1, wherein the control unit is configured to determine the turn-on time period of the second switching element according to the turn-on time period of the first switching element.

8. The power supply according to claim 1,
wherein the value corresponding to the information detected by the detection unit is a voltage value,
wherein the second voltage is larger than the first voltage, and
wherein a value corresponding to the information detected by the detecting unit in the period in which the output voltage is switched from the first voltage to the second voltage is less than a value corresponding to the information detected by the detecting unit in the first state and the second state.

9. The power supply according to claim 1,
wherein the value corresponding to the information detected by the detection unit is a voltage value,
wherein the second voltage is larger than the first voltage, and
wherein a value corresponding to the information detected by the detecting unit in a period in which the output voltage is switched from the second voltage to the first voltage is larger than a value corresponding to the information detected by the detecting unit in the first state and the second state.

10. An image forming apparatus comprising:
an image forming unit configured to form an image; and
a power supply apparatus configured to supply electric power to the image forming apparatus,
the power supply apparatus including:
  a transformer including a primary winding and a secondary winding;
  a first switching element connected in series to the primary winding of the transformer;
  a second switching element connected in parallel to the primary winding of the transformer;
  a capacitor connected in series to the second switching element, and is connected in parallel to the primary winding of the transformer together with the second switching element;
  a smoothing and rectifying unit configured to smooth and rectify a voltage induced to the secondary winding of the transformer so as to generate an output voltage;
  a detecting unit configured to detect information regarding the voltage induced to the secondary winding; and
  a control unit configured to control an operation of the first switching element and the second switching element so that the output voltage smoothed and rectified by the smoothing and rectifying unit becomes a first voltage according to the information detected by the detecting unit,
wherein, in a case where the output voltage is switched from the first voltage to a second voltage different from the first voltage, a value corresponding to the information detected by the detecting unit in a period in which the output voltage is switched from the first voltage to the second voltage is different from a value corresponding to the information detected by the detecting unit in a first state in which the output voltage is the first voltage and a value corresponding to the information detected by the detecting unit in a second state in which the output voltage is the second voltage, and
  wherein, in the case where the output voltage is switched from the first voltage to the second voltage different from the first voltage, the control unit is configured to perform control of a turn-on time period of the first switching element to gradually change the turn-on time period of the first switching element during a period in which the output voltage is switched from the first voltage to the second voltage.

11. The image forming apparatus according to claim 10, wherein, in a case where the first voltage is smaller than the second voltage, the control unit is configured to perform a control of the turn-on time period of the first switching element to gradually increase the turn-on time period of the first switching element from a turn-on time period corresponding to the first voltage to a turn-on time period corresponding to the second voltage.

12. The image forming apparatus according to claim 10, wherein, in a case where the first voltage is larger than the second voltage, the control unit is configured to perform a control of the turn-on time period of the first switching element to gradually decrease the turn-on time period of the first switching element from a turn-on time period corresponding to the first voltage to a turn-on time period corresponding to the second voltage.

13. The image forming apparatus according to claim 10, wherein, in a case where the first voltage is larger than the second voltage, the control unit is configured to perform a control so that the first and second switching elements are continuously and alternately turned on and off to output the first voltage, and so that control patterns are repeated to output the second voltage between a control pattern in which the first and second switching elements are continuously and alternately turned on and off and a control pattern in which both the first and second switching elements are turned off.

14. The image forming apparatus according to claim 10,
wherein, in a case where the output voltage is the first voltage or the second voltage, the control unit controls the operation of the first switching element and the second switching element according to the value corresponding to the information detected by the detecting unit, and
wherein, in a period in which the output voltage is switched from the first voltage to the second voltage, the control unit is configured to gradually change the turn-on time period of the first switching element.

15. The image forming apparatus according to claim 10, wherein the turn-on time period of the first switching element is defined as a period in which the switching element is turned on in one cycle as a set of turn-on and off.

16. The image forming apparatus according to claim 10, wherein the control unit is configured to determine the turn-on time period of the second switching element according to the turn-on time period of the first switching element.

17. The image forming apparatus according to claim 10, comprising a controller configured to control an operation of the image forming apparatus,
wherein the controller is configured to output a signal to switch the output voltage of the power supply apparatus from the first voltage to the second voltage.

18. The image forming apparatus according to claim 10,
wherein the value corresponding to the information detected by the detection unit is a voltage value,
wherein the second voltage is larger than the first voltage, and
wherein a value corresponding to the information detected by the detecting unit in the period in which the output voltage is switched from the first voltage to the second voltage is less than a value corresponding to the information detected by the detecting unit in the first state and the second state.

19. The image forming apparatus according to claim 10,
wherein the value corresponding to the information detected by the detection unit is a voltage value,
wherein the second voltage is larger than the first voltage, and
wherein a value corresponding to the information detected by the detecting unit in a period in which the output voltage is switched from the second voltage to the first voltage is larger than a value corresponding to the information detected by the detecting unit in the first state and the second state.

* * * * *